US008311527B2

(12) United States Patent
Jeung et al.

(10) Patent No.: US 8,311,527 B2
(45) Date of Patent: Nov. 13, 2012

(54) MOBILE COMMUNICATION TERMINAL, SERVER, SYSTEM AND METHOD FOR MESSAGE SERVICE WITH FONT DATA

(75) Inventors: Youn-Pil Jeung, Seoul (KR); Jae-Hyuk Lee, Seoul (KR); Bong-Jin Kim, Anyang-si (KR)

(73) Assignee: KT Corporation, Seongnam (KR)

( * ) Notice: Subject to any disclaimer, the term of this patent is extended or adjusted under 35 U.S.C. 154(b) by 465 days.

(21) Appl. No.: 12/502,079

(22) Filed: Jul. 13, 2009

(65) Prior Publication Data

US 2009/0275351 A1 Nov. 5, 2009

Related U.S. Application Data

(63) Continuation of application No. PCT/KR2008/000155, filed on Jan. 10, 2008.

(30) Foreign Application Priority Data

Jan. 11, 2007 (KR) ........................ 10-2007-0003518

(51) Int. Cl.
*H04L 29/08* (2006.01)

(52) U.S. Cl. ................ 455/414.4; 455/412.1; 455/414.1; 455/466; 455/420; 455/419; 709/206; 709/217; 709/219

(58) Field of Classification Search .... 455/412.1–414.4, 455/418, 466; 379/88.16, 88.22, 88.12, 88.25, 379/67.1; 709/200–204, 206, 217, 219
See application file for complete search history.

(56) References Cited

U.S. PATENT DOCUMENTS

| 6,907,444 B2* | 6/2005 | Narasimhan et al. ......... 709/200 |
| 2004/0109020 A1 | 6/2004 | Song |
| 2004/0137922 A1 | 7/2004 | Kang |
| 2005/0033814 A1 | 2/2005 | Ota |
| 2005/0207390 A1* | 9/2005 | Soheili et al. .................. 370/349 |

FOREIGN PATENT DOCUMENTS

| CN | 1514662 A | 7/2004 |
| JP | 62-202748 A | 9/1987 |

(Continued)

OTHER PUBLICATIONS

International Search Report for International Application No. PCT/KR2008/000155, dated Apr. 23, 2008.
Office Action issued in Chinese Application No. 200880002176.3 on Jan. 11, 2012.
Japanese Office Action dated Apr. 17, 2012 issued in corresponding Japanese Patent Application No. 2009-545492.

*Primary Examiner* — Jean A Gelin
*Assistant Examiner* — Babar Sarwar
(74) *Attorney, Agent, or Firm* — Sughrue Mion, PLLC

(57) ABSTRACT

A mobile communication terminal, a message service server, a message service system, and a method thereof for sending and receiving a message are disclosed. In one embodiment, the mobile communication terminal includes 1) a font encoder configured to encode a font design into font data and to encode a message text into message data so as to generate combined message data which comprises the font data and message data and 2) a font decoder configured to i) separate the font data and the message data from the combined message data, and ii) reconstruct and output a message, comprising the font design, based at least in part on the separated font data and the message data. According to one embodiment, by including the font data and message data in the transmission, the receiving mobile communication terminal can display the same font design as the original font design.

20 Claims, 7 Drawing Sheets

FOREIGN PATENT DOCUMENTS

| JP | 2-181190 A | 7/1990 |
| JP | 2005071334 | 3/2005 |
| JP | 2006100896 | 4/2006 |
| JP | 2006215654 | 8/2006 |

* cited by examiner

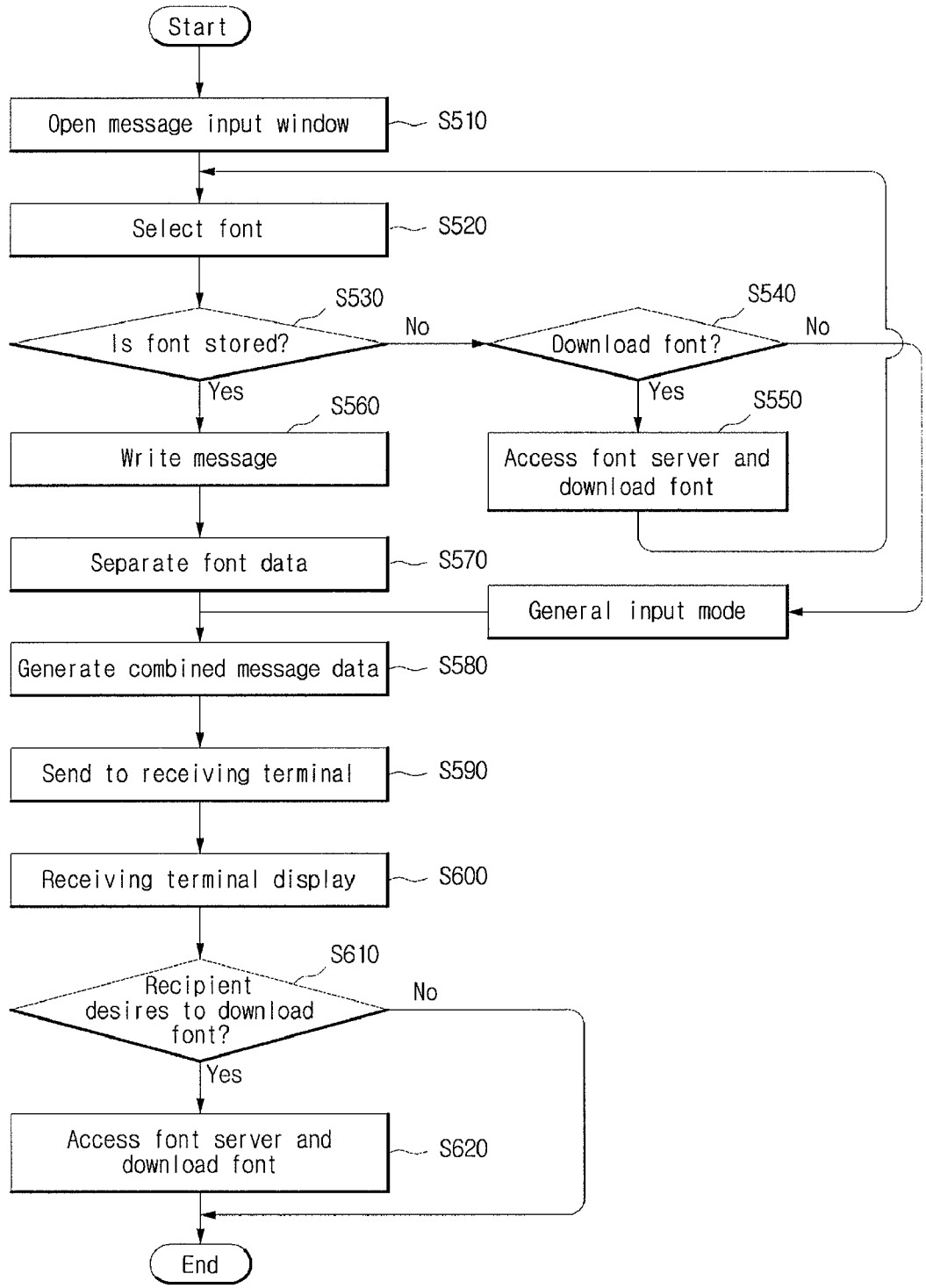

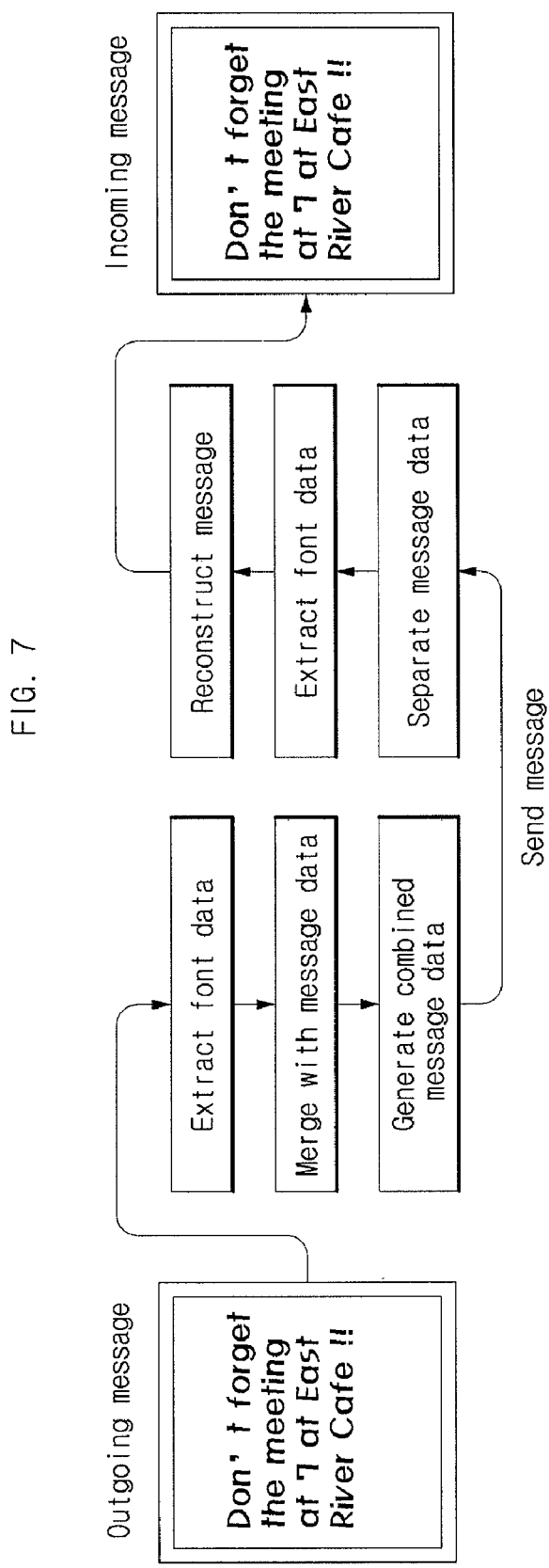

MOBILE COMMUNICATION TERMINAL, SERVER, SYSTEM AND METHOD FOR MESSAGE SERVICE WITH FONT DATA

RELATED APPLICATIONS

This application is a continuation application, and claims the benefit under 35 U.S.C. §§120 and 365 of PCT Application No. PCT/KR2008/000155, filed on Jan. 10, 2008, which is hereby incorporated by reference. PCT/KR2008/000155 also claimed priority from Korean Patent Application No. 10-2007-0003518, filed on Jan. 11, 2007, which is hereby incorporated by reference.

BACKGROUND OF THE INVENTION

Field of the Invention

The present invention relates to a mobile communication terminal, a message service server, a message service system, and a method thereof. More specifically, the present invention relates to a mobile communication terminal, a message service server, a message service system, and a method thereof that transmit a message containing font data in a mobile communication system.

SUMMARY OF CERTAIN INVENTIVE ASPECTS

One aspect of the present invention transmits font data and message data for a message having various font designs in addition to the general font design stored in a mobile communication terminal, without sending the message as an image file.

Another aspect of the present invention is a system and method for providing a message service that can display a message with the same font design as the original font design on a message display window of a receiving mobile communication terminal.

Another aspect of the present invention transmits font data and message data for a message having various font designs in addition to the general font design stored in a mobile communication terminal, without sending the message as an image file, so that the message with a variety of font designs can be precisely delivered through a system and method for providing a message service.

Another aspect of the present invention is a system and method for providing a message service that can be interesting for a receiver as well as the sender, thanks to displaying a message in various ways, by applying a variety of font designs, in addition to the general font design stored in the transmitting mobile communication terminal, in a message.

Another aspect of the present invention is a system and method for providing a message service that can transmit relatively smaller data than an image file and thus can reduce the load on the message providing system by including a variety of font data in message data of a transmitting mobile communication terminal.

Another aspect of the present invention is a mobile communication terminal that sends and receives a message in a mobile communication system, wherein the mobile communication terminal can include: a font encoder, generating combined message data by including font data, in which a font design is converted to data, and message data, in which a message text is converted to data; and a font decoder, if the combined message data is received, separating the font data and the message data from the received combined message data, and reconstructing and outputting a message having the font design by using the separated font data and the message data.

Another aspect of the present invention is a message service server which can include: a combined message data receiving unit, receiving combined message data from a transmitting mobile communication terminal; a combined message data transmitting unit, transmitting the received combined message data to a receiving mobile communication terminal. The combined message data can be generated by including font data, in which a font design is converted to data, and message data, in which a message text is converted to data.

Another aspect of the present invention is a system for providing a message service, which can include: a transmitting mobile communication terminal, generating combined message data by including font data, in which a font design is converted to data, and message data, in which a message text is converted to data, and transmitting the generated combined message data; a message service server, receiving the combined message data from the transmitting mobile communication terminal and transmitting the combined message data to a receiving mobile communication terminal; and a receiving mobile communication terminal, separating the font data and the message data from the received combined message data, if the combined message data is received from the message server, and outputting a message having the font design by using the separated font data and the message data.

Another aspect of the present invention is a method of providing a message service in a mobile communication terminal which can include: selecting a font design; inputting a message having the selected font design; converting a text of the input message to message data; converting the selected font design to font data; generating combined message data by including the converted font data and the converted message data; and transmitting the combined message data to a message service server.

Another aspect of the present invention is a method of providing a message service in a mobile communication terminal which can include: receiving combined message data, the combined message data being generated by including font data, in which a font design is converted to data, and message data, in which a message text is converted to data; separating the font data and the message data from the combined message data; reconstructing a message by using the separated font data and the message data; and outputting the reconstructed message.

Another aspect of the present invention is a method of servicing a message in a message service server, which can include: receiving combined message data from a transmitting mobile communication terminal; and transmitting the received combined message data to a receiving mobile communication terminal. The combined message data can be generated by including font data, in which a font design is converted to data, and message data, in which a message text is converted to data.

Another aspect of the present invention is a recorded medium that tangibly embodies a program of instructions to execute a method of providing a message service. The program is readable by an electronic apparatus.

The recorded medium in accordance with an embodiment of the present invention tangibly embodies a program of instructions to execute a method of providing a message service. The program is readable by an electronic apparatus and can execute: selecting a font design; inputting a message having the selected font design; converting a text of the input message to message data; converting the selected font design to font data; generating combined message data by including the converted font data and the converted message data; and transmitting the combined message data to a message service server.

Another aspect of the present invention is a recorded medium that tangibly embodies a program of instructions to execute a method of providing a message service. The program is readable by an electronic apparatus.

The recorded medium in accordance with an embodiment of the present invention tangibly embodies a program of instructions to execute a method of providing a message service. The program is readable by an electronic apparatus and can execute: receiving combined message data, the combined message data being generated by including font data, in which a font design is converted to data, and message data, in which a message text is converted to data; separating the font data and the message data from the combined message data; reconstructing a message by using the separated font data and the message data; and outputting the reconstructed message.

Another aspect of the present invention is a recorded medium tangibly embodying a program of instructions executable in a message service server to execute a method of providing a message service.

The recorded medium in accordance with an embodiment of the present invention tangibly embodies a program of instructions executable in a message service server to execute a method of providing a message service. The program is readable by an electronic apparatus and can execute: receiving combined message data from a transmitting mobile communication terminal; and transmitting the received combined message data to a receiving mobile communication terminal. The combined message data can be generated by including font data, in which a font design is converted to data, and message data, in which a message text is converted to data.

Another aspect of the invention is a mobile communication terminal for sending and receiving a message, comprising: a font encoder configured to encode a font design into font data and to encode a message text into message data so as to generate combined message data which comprises the font data and message data; and a font decoder configured to i) separate the font data and the message data from the combined message data, and ii) reconstruct and output a message, comprising the font design, based at least in part on the separated font data and the message data.

In the above terminal, the font encoder comprises: a message data generator configured to convert the message text to message data; a font data generator configured to convert the font design to font data; and a combined message generator configured to generate the combined message data which includes the message data and the font data. In the above terminal, the font decoder comprises: a font data separator configured to separate the font data from the combined message data; and a message reconstructing unit configured to reconstruct a message, comprising the font design, based at least in part on the separated font data and the message data.

In the above terminal, the font data comprises at least one selected from the group consisting of a header, a font identification unit, a data length information unit, a glyph length information unit, a font data unit, and a glyph data unit. In the above terminal, the number of the font data units is the same as the number of characters in the message, and wherein the font data unit comprises at least one selected from the group consisting of i) a code which stores a standard size code value of a language used in the message, ii) a width which stores a width value of the message characters, and iii) an offset which stores a vector font data value of the message characters.

In the above terminal, the glyph data unit comprises a glyph data value in which character information of the font design is converted to data. In the above terminal, the font data further comprises effects data, in which at least one of visually stimulating symbols, figures, and pictures included in the font design is converted to data. In the above terminal, the font encoder and the font decoder are included in a font codec and are configured to be run on an operating system platform of the mobile communication terminal.

Another aspect of the invention is a message service server for sending and receiving a message, comprising: a combined message data receiver configured to receive combined message data from a transmitting mobile communication terminal, wherein the combined message data comprises i) font data which is encoded data of a font design, and ii) message data which is encoded data of a message text; and a combined message transmitter configured to transmit the received combined message data to a receiving mobile communication terminal.

In the above server, the combined message data further comprises a font codec configured to output a message, comprising the font design, based at least in part on the font data. In the above server, the message service server is a multimedia message service center (MMSC).

Another aspect of the invention is a system for providing a message service, comprising: a transmitting mobile communication terminal configured to i) encode a font design into font data and to encode a message text into message data so as to generate combined message data which comprises the font data and message data and ii) transmit the generated combined message data; a message service server configured to receive the combined message data from the transmitting mobile communication terminal and transmit the combined message data; and a receiving mobile communication terminal configured to i) receive the combined message data from the message service server, ii) separate the font data and the message data from the received combined message data, and iii) output a message, comprising the font design, based at least in part on the separated font data and the message data.

The above system further comprises a font providing server configured to provide the font data to the transmitting mobile communication terminal. In the above system, the font providing server comprises a font database which stores the font data. In the above system, the font providing server is configured to convert the font design to font data and wherein the font providing server comprises a font codec configured to output a message, comprising the font design, based at least in part on the font data.

Another aspect of the invention is a method of providing a message service in a mobile communication terminal, comprising: selecting a font design; receiving a message comprising the selected font design; converting a text of the received message to message data; converting the selected font design to font data; generating combined message data which comprises the converted font data and the converted message data; and transmitting the combined message data to a message service server.

The above method, further comprises, prior to selecting the font design, downloading the font data from a font providing server. In the above method, the transmitting comprises: including in the combined message data a font codec configured to output a message, comprising the font design, based at least in part on the font data; and transmitting the combined message data which comprises the font codec, to the message service server.

Another aspect of the invention is a method of providing a message service in a mobile communication terminal, comprising: receiving combined message data, wherein the combined message data comprises i) font data which is encoded data of a font design, and ii) message data which is encoded data of a message text; separating the font data and the message data from the combined message data; reconstructing a message based at least in part on the separated font data and the message data; and outputting the reconstructed message.

In the above method, the receiving comprises, if a font codec is further included in the combined message data, separating the font codec included in the combined message data. In the above method, the reconstructing comprises: reconstructing characters of the message data based at least in part on glyph data included in the font data, wherein the glyph data is indicative of character structure information of the font design; and providing a visual effect to the reconstructed message based at least in part on effects data included in the font data.

Another aspect of the invention is a method of servicing a message in a message service server, comprising: receiving combined message data from a transmitting mobile communication terminal, wherein the combined message data comprises i) font data which is encoded data of a font design, and ii) message data which is encoded data of a message text; and transmitting the received combined message data to a receiving mobile communication terminal.

Another aspect of the invention is one or more processor-readable storage devices having processor-readable code, the processor-readable code for programming one or more processors to perform a method of providing a message service, the method comprising: selecting a font design; receiving a message comprising the selected font design; converting a text of the received message to message data; converting the selected font design to font data; generating combined message data which comprises the converted font data and the converted message data; and transmitting the combined message data to a message service server.

Still another aspect of the invention is one or more processor-readable storage devices having processor-readable code, the processor-readable code for programming one or more processors to perform a method of providing a message service, the method comprising: receiving combined message data, wherein the combined message data comprises i) font data which is encoded data of a font design, and ii) message data which is encoded data of a message text; separating the font data and the message data from the combined message data; reconstructing a message based at least in part on the separated font data and the message data; and outputting the reconstructed message.

Still another aspect of the invention is one or more processor-readable storage devices having processor-readable code, the processor-readable code for programming one or more processors to perform a method of providing a message service, the method comprising: receiving combined message data from a transmitting mobile communication terminal, wherein the combined message data comprises i) font data which is encoded data of a font design, and ii) message data which is encoded data of a message text; and transmitting the received combined message data to a receiving mobile communication terminal.

Still another aspect of the invention is a mobile communication terminal for sending and receiving a message, comprising: means for selecting a font design; means for receiving a message comprising the selected font design; means for converting a text of the received message to message data; means for converting the selected font design to font data; means for generating combined message data which comprises the converted font data and the converted message data; and means for transmitting the combined message data to a message service server.

BRIEF DESCRIPTION OF THE DRAWINGS

FIG. 6 shows a flowchart of a method for providing a message service having a variety of font designs in accordance with an embodiment of the present invention.

FIG. 7 shows a method of providing a message service in accordance with an embodiment of the present invention.

DETAILED DESCRIPTION OF CERTAIN INVENTIVE EMBODIMENTS

Figure 1:
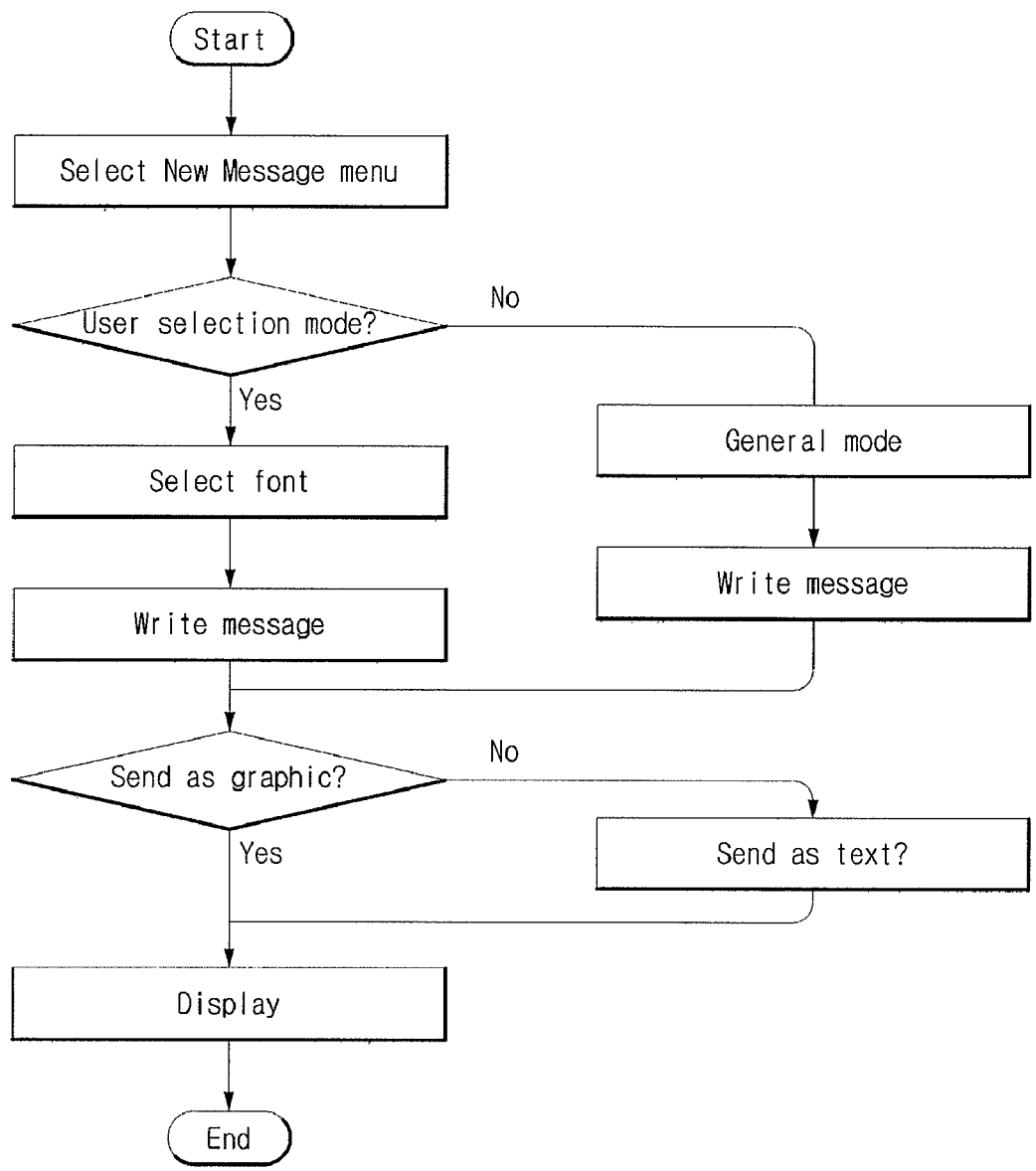
FIG. 1 shows a method of servicing a message having a variety of fonts.

FIG. 1 is a diagram for illustrating how a message with a plurality of fonts is serviced. When a message is sent from a terminal in the above method, a text file containing a binary form of text code, defined in KSC5601 or Unicode, is transmitted. If the message contains a font design that is different from the general font design stored in the terminal, a graphic file is transmitted, as illustrated in FIG. 1.

The message transmission service only transmitted a code structure, defined in KSC5601 or Unicode, when the text is sent. Therefore, the information on the font design of the sender could not be transmitted. To address this limitation, the sender's font design has been sent as an image.

The method of sending an image does not transmit the text itself but rather an image containing the text, and thus an additional function of converting the text to an image is needed.

The display size of each mobile communication terminal is different. Hence, when the message is converted to an image of predetermined size, the image size of an original message is different according to the display size of each mobile communication terminal. Consequently, the top and bottom or the left side and right side of the displayed message were covered or cut off.

In the image transmission method, the data size is relatively larger than that of the text data transmission method, possibly overloading the message service providing system. Moreover, the created message cannot be transferred exactly the way it was created, unlike the original intension of the service.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description, the detailed description of certain irrelevant elements will be omitted.

Figure 2:
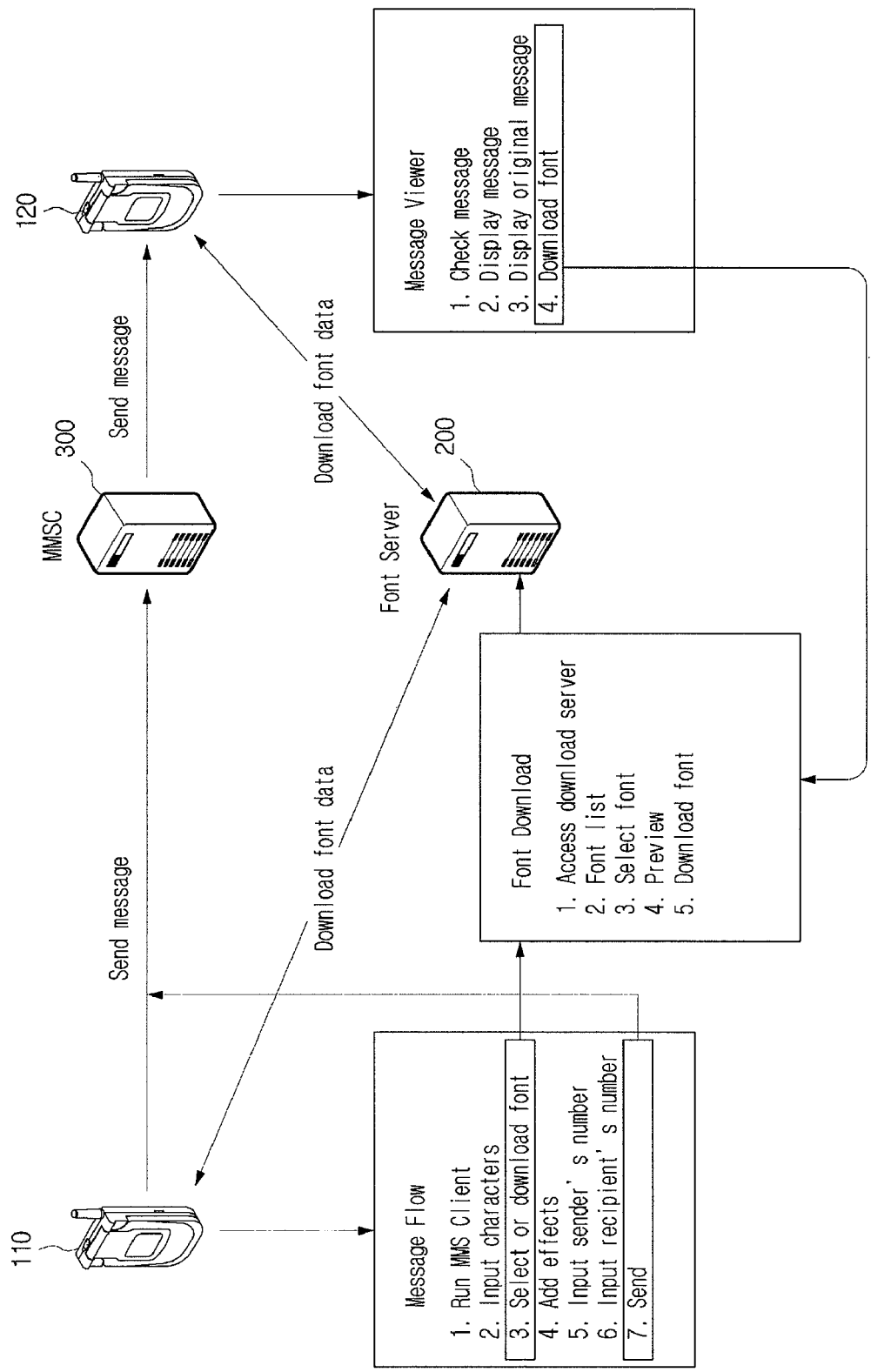
FIG. 2 shows a system for providing a message service in accordance with an embodiment of the present invention.

FIG. 2 shows a system for providing a message service in accordance with an embodiment of the present invention. Although the message providing service having a variety of font designs can be applied to a variety of message providing services, including an e-mail service, an MMS (multimedia message service), and an SMS (short message service), the following description will focus on the MMS.

Referring to FIG. 2, the system of providing a message service can include an MMS server (hereinafter referred to as "MMSC") 300, which provide the MMS, and a font providing server 200, which provides a variety of font data. The system can also include a billing server (not shown) that handles billing for providing the MMS and font data.

When a transmitting mobile communication terminal 100 creates an MMS message in order to use the MMS, the transmitting mobile communication terminal 100 chooses a font to be used in the MMS message. If the selected font has been stored in the transmitting mobile communication terminal 110, stored font data is extracted and added to the MMS message to be transmitted. The font data can be included in the MMS message to be transmitted to a receiving mobile communication terminal 120 according to the 3GPP international standard or the MIME type used in the e-mail.

If, however, the font design to be used is not stored in the transmitting mobile communication terminal 110, the transmitting mobile communication terminal downloads the selected font data from the font providing server 200 through a data communication network, which can be a mobile communication network or the Internet.

The transmitting mobile communication terminal 110 and receiving mobile communication terminal 120 can include a font codec, which encodes and decodes glyph data of the font included in the message data. The font codec can reconstruct the received message by using the font data and a font encoder, which is for separating the font data from the message and including the font data in the message data. The reconstructed message can be displayed on a message display window by using a font decoder. The font codec can include a single codec API (application program interface).

One embodiment of the present invention transmits the font design by not making the design as an image but by encoding the font design as data. Therefore, the line breaks, character spacing, and font size can be freely adjusted when the reconstructed message is output. For a vector font, particularly, the font display (i.e. font size, line spacing, etc.) can be optimized in accordance with the display size of a mobile terminal of a user. The font codec can also support a mobile data font, which takes hardware memory specification of a wireless internet environment and terminals 110, 120 into consideration, in order to send a variety of font data by applying the font codec technology on the wireless internet.

The transmitting mobile communication terminal 110 and receiving mobile communication terminal 120 can download a font codec by accessing the font providing server 200, in case the font codec is not included. If the font codec is not included in the receiving mobile terminal 120, the transmitting mobile communication terminal 110 can include the font codec and font data in the message data to be sent to the receiving mobile communication terminal 120.

The font providing server 200 provides the font data to the transmitting mobile communication terminal 110 or receiving mobile communication terminal 120. The font data is data for displaying the characters and effects of the font design selected in the terminal 110 and/or 120. The font providing server 200 can include a font database, which stores a variety of font data. The font providing server 200 can also provide a font codec to the terminal 110 or 120 without the font codec that processes the data to transmit the message containing the font data. If the font data or font codec is provided by being connected to a billing server (not shown) of the mobile communication network, the font providing server 200 can handle the billing. The font providing server 200 can handle the billing through various methods, such as billing to a landline telephone account, billing to a mobile phone account, billing to a credit card, and billing to a bank account.

The font data provided by the font providing server 200 is downloaded as content such that the terminal can use a message client program to select the downloaded font and use to customize the message content. In order for new font data added in the font providing server 200 to be displayed in both the transmitting mobile communication server 110 and receiving mobile communication server 120, the message client programs in both terminals have to be compatible.

The MMSC 300 is the server that provides the MMS, and delivers the MMS that includes font data to the receiving mobile communication terminal 120, along with a general MMS message. There can be a single MMSC as well as a plurality of servers.

The receiving mobile communication terminal 120 can display the MMS message containing the font data created in the transmitting mobile communication terminal 110, through the MMSC 300. It is not necessary for the receiving mobile communication terminal 120 to have stored font data for displaying the MMS message with the font data. The font data included in the MMS message data is separated and applied to the message content to be displayed in the message display window. The receiving mobile communication terminal can have the font codec. If there is no font codec, the font codec can be downloaded from the font providing server 200 and installed. The receiving mobile communication terminal 120 can separate the font codec from combined message data transmitted from the transmitting mobile communication terminal 110 and reconstruct the message by using the separated font codec.

Figure 3:
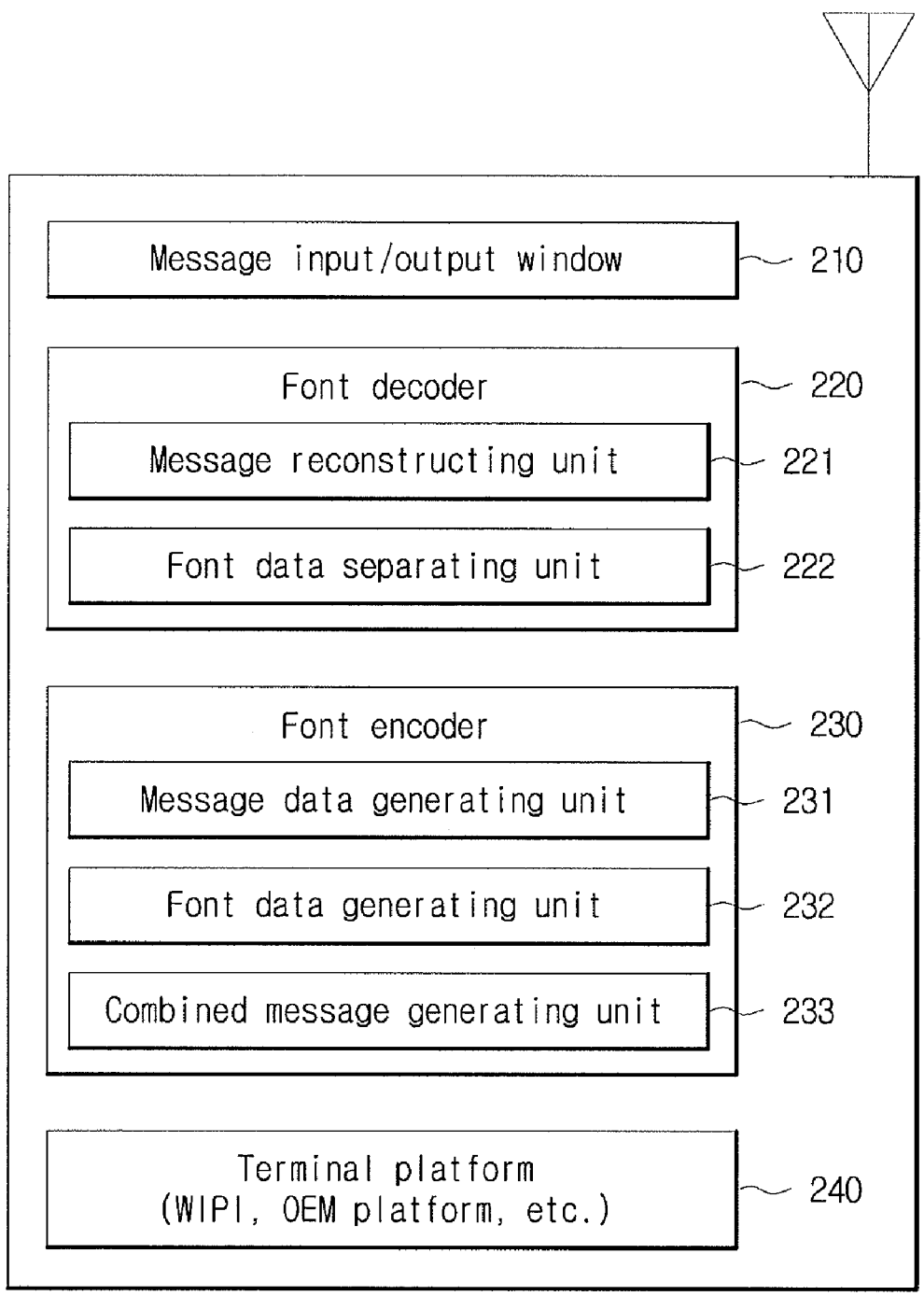
FIG. 3 shows a block diagram of a mobile communication terminal, which provides a message service, in accordance with an embodiment of the present invention.

FIG. 3 is a block diagram of a mobile communication terminal to which the message service is provided in accordance with an embodiment of the present invention.

The mobile communication terminals 110 and 120 to which the message service is provided in accordance with an embodiment of the present invention includes a message input/output window 210, through which a message is input and output to provide the message service, a font encoder 230, which generates combined message data by including font data, which is converted from the font design, and message data, which is converted from the message content, and a font decoder 220, which separates the font data and message data from the combined message data and reconstructs and displays the message with the font design by using the separated font data and message data. The font encoder 230 and font decoder 220 can be structured as a single codec API.

The message input/output window 210 is a display window, on which a message is written to provide the message service or a received message is reconstructed and displayed.

The font encoder 230 includes a message data generating unit 231, which converts the created message content as data, a font data generating unit 232, which converts the font design as font data, and a combined message data generating unit 233, which generates combined message data by including the message data and font data.

The message data generating unit 231 generates the message data by converting the message content created in the message input/output window to data. The message data can be a text file in the binary format of KSC5601 or Unicode. In addition, the size of the message data is in accordance with the message size data specification that is used in the wireless data network.

The font data generating unit 232 generates the font data by converting the font design to data. The font data includes glyph data, in which the character information of the font design is converted to data. The font data can also include effects data, in which at least one of symbols, figures and pictures is converted to data.

The combined message data generating unit 233 generates the combined message data by including the message data and font data. This will be further described later with reference to FIG. 4.

The font decoder 220 includes a font data separating unit 222, which separates the font data from the combined message data if the combined message data is received, and a message reconstructing unit 221, which reconstructs the message having the font design by using the separated font data and message data.

The font data separating unit 222 separates the font data from the combined message data if the combine message data is received. In other words, the font data separating unit 222 separates the glyph data, which displays the characters of the font design, and the effects data of the font design from the combined message data.

The message reconstructing unit 221 reconstructs the message with the font design created in the transmitting mobile communication terminal 110 by using the font data and message data that are separated from the combined message data and displays the reconstructed message in the message input/output window 210. The message reconstructing unit 221 reconstructs the message by using the character glyph data in the separated font data to rasterize and render the font set and by using the effects data to give visual effects. By this, the message reconstructing unit 221 displays on the input/output window 210 the same message with the font design as created in the transmitting mobile communication terminal 110.

It shall be evident that the codec API can run in an OS platform of the terminal and can be operated on a WIPI (Wireless Internet Platform for Interoperability).

Figure 4:
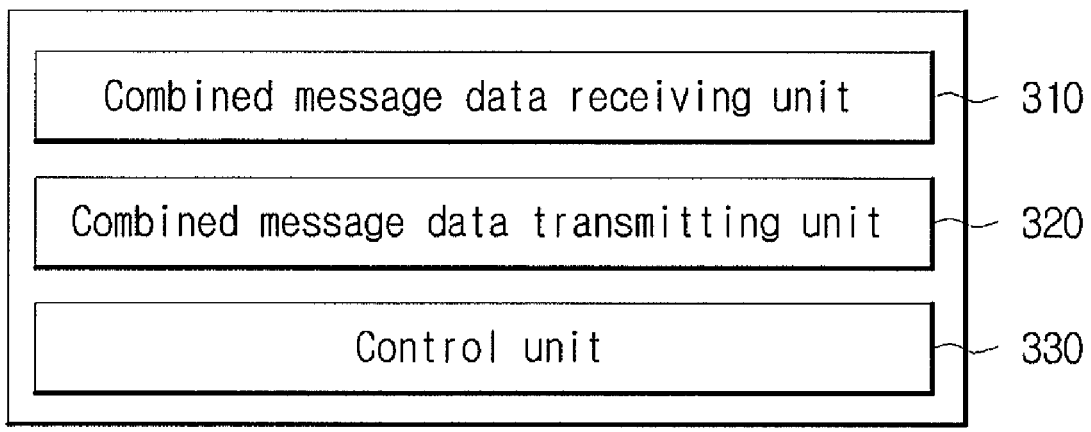
FIG. 4 shows a block diagram of a message service server, which provides a message service, in accordance with an embodiment of the present invention.

FIG. 4 is a block diagram of a message service server, which provides a message service, in accordance with an embodiment of the present invention. Referring to FIG. 4, the MMSC 300, which is the message service server, includes a combined message data receiving unit 310, which receives the combined message data from the transmitting mobile communication terminal 110, a combined message data transmitting unit 320, which transmits the received combined message data to the receiving mobile communication unit 120, and a control unit 330.

The combined message data receiving unit 310 receives the combined message data from the transmitting mobile communication terminal 110. The combined message data receiving unit 310 receives the combined message data created by the transmitting mobile communication terminal 110 through a switch (not shown).

The combined message data transmitting unit 320 transmits the received combined message data to the receiving mobile communication terminal 120. The combined message data transmitting unit 320 transmits the combined message data received through the switch to the receiving mobile communication terminal 120 through a public mobile communication network, by receiving location information of the receiving mobile communication terminal 120 from a corresponding a visitor location register or home location register. As the method of providing the message service in the MMSC 300 is well known to those of ordinary skill in the art, the pertinent description will not be provided herein.

Figure 5:
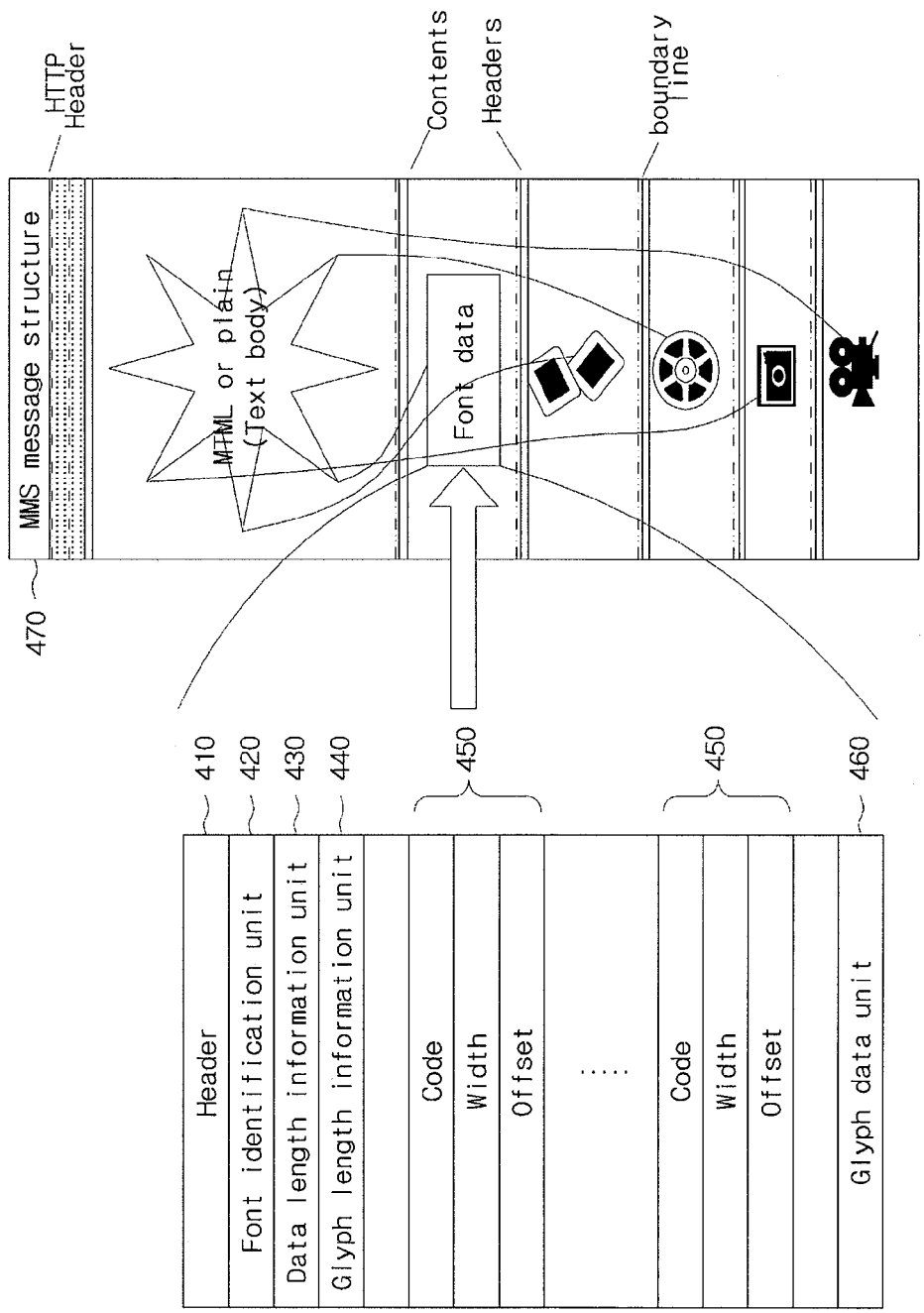
FIG. 5 shows the structure of font data and an MMS message having the font data in accordance with an embodiment of the present invention.

FIG. 5 illustrates the structure of font data and the structure of an MMS message having the font data in accordance with an embodiment of the present invention.

As shown in FIG. 5, the font data included in the combined message data includes a header 410, a font identification unit 420, a data length information unit 430, a glyph length information (number of embedded glyph) unit 440, a font data unit 450, and a glyph data unit 460. The font data can be, for example, character information of a particular font. The font data can also include effects data, in which at least one of symbols, figures, and pictures is converted to data, to make the font design visually more interesting, and a data field for the effects data.

The header 410 is written with essential information of the font data, and the font identification unit 420 is written with a name that identifies the font in the size of, for example, 4 bytes.

The data length information unit 430 is stored with information on the overall size of the font data included in the message data, and the glyph length information unit 440 is stored with information on the number of characters included in the message. The data length information unit 430 and the glyph length information unit 440 can each have the size of, for example, 2 bytes.

The number of font data units 450 is the same as the number of message characters included in the font data. The font data unit 450 can include a code, width, and offset. The code stores a code value of KSC5601 or Unicode, as a standard code value of Korean characters used in the message. As the variable width of the character, the width stores a width value of a vector font. The offset is a vector font data value and can store an overall data value (length, height and rotation values of a stroke) for drawing one vector font character. The glyph data unit 460 stores information on the glyph data, and its size is variable.

The transmitting mobile communication terminal 110 structures the above font data as a part of the MMS message in the 3GPP MMS international standard and MIME type of e-mail. The transmitting mobile communication terminal 110 transmits the MMS message 470 to the receiving mobile communication terminal 120 through the MMSC 300.

The font encoder 230 and font decoder 220 included in the mobile communication terminal can support an MDF (mobile data font) format and an EDF (embedded data font) format, which consider the mobile Internet environment and the hardware memory specification of the terminals 110 and 120, in order to sent a variety of font data on the wireless Internet. The MDF format and EDF format are dedicated for the wireless Internet, complies with the KSC5601 and Unicode 4.0, and has the same Korean font size as the conventional Windows TTF font. Moreover, being an average size of 200 KB, the MDF format can be compressed up to 150 KB.

FIG. 6 is a flowchart for a method of providing a message with a variety of font designs in accordance with an embodiment of the present invention. In the step represented by S510, the transmitting mobile communication terminal 110 runs a message client program and opens the message input/output window 210 for writing a message, in case a user enters a menu for writing the message and selects to write the message.

In S520, a message text is input in the message input/output window 210, which is opened in the transmitting mobile communication terminal 110. The input message text is converted to message data and is temporarily stored in the transmitting mobile communication terminal 110. After the message text is input, the font design to be applied to the input message text is selected in the transmitting mobile communication terminal 110.

In S530, it is determined whether the selected font design is already stored in the transmitting mobile communication terminal 110.

If the font design selected in S530 is already stored in the transmitting mobile communication terminal 110, the flow moves to S560, and otherwise to S540.

In S540, it is determined whether to download the font data is input by the user. Here, the font data is converted from the font design to be applied to the message text in the transmitting mobile communication terminal 110. For example, the font data can include glyph data, in which the character information of the font design is converted to data, or effects data, in which at least one of symbols, figures, and pictures for stimulating visual interest is converted to data.

In S550, if the user has determined to download the font data, the transmitting mobile communication terminal 110 accesses the font providing server 200 and downloads the font data. If the font data is downloaded by the transmitting mobile communication terminal 110, the font providing server 200 can access a billing server (not shown) of the mobile communication network and performs the billing. The font providing server 200 can handle the billing through various methods, such as billing to a landline telephone account, billing to a mobile phone account, billing to a credit card, and billing to a bank account.

In S560, a message to which the downloaded font data is applied is created in the transmitting mobile communication terminal 110. The created message is displayed with the font design on the message input/output window 210 of the transmitting mobile communication terminal 110.

In S570, the font glyph data and effects data are separated from the message with the font design that is displayed on the message input/output window 210 of the transmitting mobile communication terminal 110. Here, the effects data can be symbols, figures, color information, and special effects, for example, flashing or moving characters, which stimulate visual interest.

In S580, combined message data is generated by including the separated font data and message data. The size of message data right before inserting the font data complies with the standard message size data specification that is conventionally used in the wireless data network.

In S590, the generated combined message data is transmitted to the receiving mobile communication terminal 120 through the MMSC 300.

In S600, if the combined message data is received, the receiving mobile communication terminal 120 separates the font glyph data and effects data that were used to design the message in the combined message data. The receiving mobile communication terminal 120 reconstructs the message by using the character glyph data and the separated font data to rasterize and render the font set and adds the symbols, figures, and pictures that give visual effects. The receiving mobile communication terminal 120 also can display on the message input/output window 210 the message with the font design, along with a multimedia object, such as a picture or video, which were transmitted by the sender.

In S610 and S620, the receiving mobile communication terminal 120 can store the font data separated from the received combined message data. It shall be also evident that the font providing server 200 can be accessed to store additional font data and the font data can be received to reconstruct and transmit a future message.

FIG. 7 illustrates the method of providing the message service in accordance with an embodiment of the present invention. For the convenience of description and understanding, an example is described herein.

Suppose the transmitting mobile communication terminal 110 runs a message client program and inputs a message, saying "Don't forget the meeting at 7 at East River Café!!" The input message text is converted to message data and is temporarily stored. The transmitting mobile communication terminal 110 applies the font design stored in the transmitting mobile communication terminal 110 or downloaded from the font providing server 200 to the above message to create the message with a new font design that displays "Don't forget the meeting at 7 at East River Café!!" and sends an MMS message along with a multimedia object such as a picture or video.

In case the MMS message is sent from the transmitting mobile communication terminal 110, the font design is converted to generate font data. The generated font data generates combined message data by including the message data displaying the message text. The combined message data is transferred to the receiving mobile communication terminal 120 through the MMS message server 300.

The receiving mobile communication terminal 120 temporarily stores the transferred combined message data and separates the font data from the combined message data.

The receiving mobile communication terminal 120 applies the separated font data to the message data having the message text and reconstructs a new message with the font data and displays "Don't forget the meeting at 7 at East River Café!!" on the message output window. The receiving mobile communication terminal 120 can store the font data separated from the received combined message data in a memory or a storage device for future use of reconstructing a message having the same font.

The method described above can be embodied in a form of a program and stored as a computer-readable form in a recording medium (e.g. CD-ROM, RAM, ROM, floppy disk, hard disk, optical disk, etc.).

When a message containing a variety of font designs is created in and transmitted from a transmitting mobile terminal, one embodiment of the present invention creates and transmits combined message data containing font data and message data. Therefore, even though the font used to create the message has not been previously stored in a receiving mobile terminal, the same message as shown in the transmitting mobile terminal can be output in the receiving mobile terminal.

At least one embodiment of the present invention does not transmit a message having a variety of font designs other than the general font design stored in the transmitting mobile communication terminal as an image file. Moreover, by including the font data and message data in the transmission, the receiving mobile communication terminal can display the same font design as the original font design.

Furthermore, by including the font data and message data in the transmission, at least one embodiment of the present invention can make a precise delivery of a message having a variety of font designs.

At least one embodiment of the present invention can also be interesting for a receiver as well as the sender, thanks to displaying a message in various ways, by applying a variety of font designs, in addition to the general font design stored in the transmitting mobile communication terminal, in a message.

At least one embodiment of the present invention can also transmit relatively smaller data than an image file and thus can reduce the load on the message providing system by including a variety of font data in message data of a transmitting mobile communication terminal.

While the above description has pointed out novel features of the invention as applied to various embodiments, the skilled person will understand that various omissions, substitutions, and changes in the form and details of the device or process illustrated may be made without departing from the scope of the invention. All variations coming within the meaning and range of equivalency of the claims are embraced within their scope.

What is claimed is:

1. A mobile communication terminal for sending and receiving a message, comprising:
   a font encoder configured to encode a font design into font data and to encode a message text into message data so as to generate combined message data which comprises the font data, and message data and a font codec; and
   a font decoder configured to i) separate the font data, the message data and the font codec from the combined message data, and ii) reconstruct and output a message, comprising the font design, based on the separated font data, the message data and the font codec,
   wherein the font decoder comprises:
      a font data separator configured to separate the font data from the combined message data; and
      a message reconstructing unit configured to reconstruct a message, comprising the font design, based on the separated font data, the message data and the font codec.

2. The mobile communication terminal of claim 1, wherein the font encoder comprises:
   a message data generator configured to convert the message text to message data;
   a font data generator configured to convert the font design to font data; and
   a combined message generator configured to generate the combined message data which includes the message data, the font data and the font codec.

3. The mobile communication terminal of claim 1, wherein the font data comprises at least one selected from the group consisting of a header, a font identification unit, a data length information unit, a glyph length information unit, a font data unit, and a glyph data unit.

4. The mobile communication terminal of claim 3, wherein the number of the font data units is the same as the number of characters in the message, and wherein the font data unit comprises at least one selected from the group consisting of i) a code which stores a standard size code value of a language used in the message, ii) a width which stores a width value of the message characters, and iii) an offset which stores a vector font data value of the message characters.

5. The mobile communication terminal of claim 3, wherein the glyph data unit comprises a glyph data value in which character information of the font design is converted to data.

6. The mobile communication terminal of claim 3, wherein the font data further comprises effects data, in which at least one of visually stimulating symbols, figures, and pictures included in the font design is converted to data.

7. A message service server for sending and receiving a message, comprising:
   a combined message data receiver configured to receive combined message data from a transmitting mobile communication terminal, wherein the combined message data comprises i) font data which is encoded data of a font design, ii) message data which is encoded data of a message text and iii) a font codec; and
   a combined message transmitter configured to transmit the received combined message data to a receiving mobile communication terminal,
   wherein the font codec is configured to output a message, comprising the font design, based at least in part on the font data,
   wherein the receiving mobile communication terminal is configured to separate the font data from the combined message data and configured to reconstruct a message, comprising the font design, based on the separated font data, the message data, and the font codec.

8. The message server of claim 7, wherein the message service server is a multimedia message service center (MMSC).

9. A system for providing a message service, comprising: a transmitting mobile communication terminal configured to i) encode a font design into font data and to encode a message text into message data so as to generate combined message data which comprises the font data, message data and a font codec and ii) transmit the generated combined message data;
   a message service server configured to receive the combined message data from the transmitting mobile communication terminal and transmit the combined message data; and
   a receiving mobile communication terminal configured to i) receive the combined message data from the message service server, ii) separate the font data, the message data and the font codec from the received combined message data, iii) reconstruct a message comprising the font design based on the separated font data, the message data and the font codec, and iii) output the message.

10. The system of claim 9, further comprising a font providing server configured to provide the font data to the transmitting mobile communication terminal.

11. The system of claim 10, wherein the font providing server comprises a font database which stores the font data.

12. A method of providing a message service in a mobile communication terminal, comprising:
- selecting a font design;
- receiving a message comprising the selected font design;
- converting a text of the received message to message data;
- converting the selected font design to font data;
- generating combined message data which comprises the converted font data, the converted message data and a font codec;
- transmitting the combined message data to a message service server; and
- receiving the combined message data from the message service server by a mobile terminal;
- wherein the transmitting comprises:
  - including, in the combined message data, the font codec configured to output a message, comprising the font design, based at least in part on the font data; and
  - transmitting, the combined message data which comprises the font codec, to the message service server,
- wherein the receiving mobile terminal separates the font data from the combined message data and reconstructs a message comprising the font design, based on the separated font data, the message data, and the font codec.

13. The method of claim 12, further comprising, prior to selecting the font design, downloading the font data from a font providing server.

14. A method of providing a message service in a mobile communication terminal, comprising:
- receiving combined message data from a mobile communication terminal, wherein the combined message data comprises i) font data which is encoded data of a font design, ii) message data which is encoded data of a message text and iii) a font codec;
- separating the font data, the message data and the font codec from the combined message data;
- reconstructing a message based at least in part on the separated font data, the message data and the font codec; and
- outputting the reconstructed message.

15. The method of claim 14, wherein the reconstructing comprises:
- reconstructing characters of the message data based at least in part on glyph data included in the font data, wherein the glyph data is indicative of character structure information of the font design; and
- providing a visual effect to the reconstructed message based at least in part on effects data included in the font data.

16. A method of servicing a message in a message service server, comprising:
- receiving combined message data from a transmitting mobile communication terminal, wherein the combined message data comprises i) font data which is encoded data of a font design, ii) message data which is encoded data of a message text and iii) a font codec; and
- transmitting the received combined message data to a receiving mobile communication terminal,
- wherein the font codec is configured to output a message, comprising the font design, based at least in part on the font data, and
- wherein the receiving mobile terminal separates the font data from the combined message data and reconstructs a message, comprising the font design, based on the separated font data, the message data, and the font codec.

17. One or more non-transitory processor-readable storage devices having processor-readable code, the processor-readable code for programming one or more processors to perform a method of providing a message service, the method comprising:
- selecting a font design;
- receiving a message comprising the selected font design;
- converting a text of the received message to message data;
- converting the selected font design to font data;
- generating combined message data which comprises the converted font data, the converted message data and a font codec;
- transmitting the combined message data to a message service server; and
- receiving the combined message from the message service server by a mobile communication terminal,
- wherein the transmitting comprises:
  - including, in the combined message data, the font codec configured to output a message, comprising the font design, based at least in part on the font data; and
  - transmitting, the combined message data which comprises the font codec, to the message service server,
- wherein the receiving mobile terminal separates the font data from the combined message data and reconstructs a message, comprising the font design, based on the separated font data, the message data and the font codec.

18. One or more non-transitory processor-readable storage devices having processor-readable code, the processor-readable code for programming one or more processors to perform a method of providing a message service, the method comprising:
- receiving combined message data from a mobile terminal, wherein the combined message data comprises i) font data which is encoded data of a font design, ii) message data which is encoded data of a message text and iii) a font codec;
- separating the font data, the message data and the font codec from the combined message data;
- reconstructing a message based on the separated font data, the message data and the font codec; and
- outputting the reconstructed message.

19. One or more non-transitory processor-readable storage devices having processor-readable code, the processor-readable code for programming one or more processors to perform a method of providing a message service, the method comprising:
- receiving combined message data from a transmitting mobile communication terminal, wherein the combined message data comprises i) font data which is encoded data of a font design, ii) message data which is encoded data of a message text and iii) a font codec; and
- transmitting the received combined message data to a receiving mobile communication terminal,
- wherein the font codec is configured to output a message, comprising the font design, based at least in part on the font data, and
- wherein the receiving mobile communication terminal separates the font data from the combined message data and reconstructs a message, comprising the font design, based on the separated font data, the message data and the font codec.

20. The mobile communication terminal of claim 1, wherein the font codec is configured to output a message, comprising the font design, based at least in part on the font data.

* * * * *